(12) United States Patent
Siggins et al.

(10) Patent No.: US 6,641,787 B1
(45) Date of Patent: Nov. 4, 2003

(54) CHEMICAL DISPENSER

(76) Inventors: George Siggins, 724 Vera Ave., Ripon, CA (US) 95366; Richard L. May, 816 Duncan Pl., Manhattan Beach, CA (US) 90266

( * ) Notice: Subject to any disclaimer, the term of this patent is extended or adjusted under 35 U.S.C. 154(b) by 319 days.

(21) Appl. No.: 09/639,252

(22) Filed: Aug. 14, 2000

(51) Int. Cl.[7] ............................................... B01D 11/02
(52) U.S. Cl. ...................... 422/264; 422/261; 422/265; 210/242.1; 210/198.1
(58) Field of Search ................................ 422/264, 265, 422/261; 210/242.1, 198.1

(56) References Cited

U.S. PATENT DOCUMENTS

| | | | | |
|---|---|---|---|---|
| D275,311 S | * | 8/1984 | Wolfe | D23/207 |
| 4,781,897 A | * | 11/1988 | Geron et al. | 422/265 |
| 4,798,707 A | * | 1/1989 | Thomas et al. | 422/264 |
| 4,828,804 A | * | 5/1989 | Nicholson et al. | 422/264 |
| 4,828,805 A | * | 5/1989 | Connors | 137/268 |
| 4,880,547 A | * | 11/1989 | Etani | 210/728 |
| 4,917,868 A | * | 4/1990 | Alexander et al. | 137/268 |
| 5,059,316 A | * | 10/1991 | Renton | 210/198.1 |
| 5,312,601 A | * | 5/1994 | Patrick | 119/51.04 |
| 5,526,602 A | * | 6/1996 | Day, Sr. | 43/35 |
| 5,810,201 A | * | 9/1998 | Besse et al. | 222/39 |

OTHER PUBLICATIONS

Web site for Cloriduck, Inc., Automatic Pool Chlorinators 1993–1999.
Web site for Pool Mart, Floating Chlorine Dispenser, undated.
Web site for Haxnicks, Swimming Pools, 1999.
Web site for Seasonal Leisure Products, Floating Chlorine Dispenser, undated.

* cited by examiner

Primary Examiner—Krisanne Thornton

(57) ABSTRACT

The present invention is a chemical dispenser, preferably for dispensing chlorine or bromine to pools, spas, and hot tubs. The preferred embodiment is a buoyant vessel connected to a sea creature-shaped dispenser vessel by a line, where the sea creature-shaped dispenser vessel has a buoyant shell and a cargo chamber that has an insertion port and a permeable surface with a plurality of dissolution ports.

14 Claims, 5 Drawing Sheets

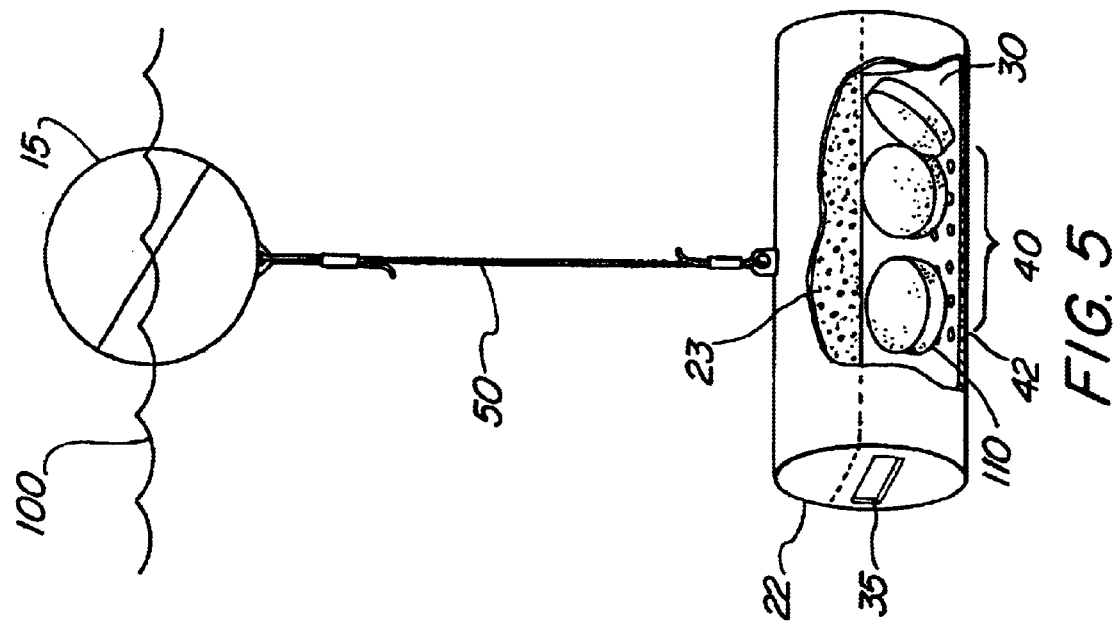
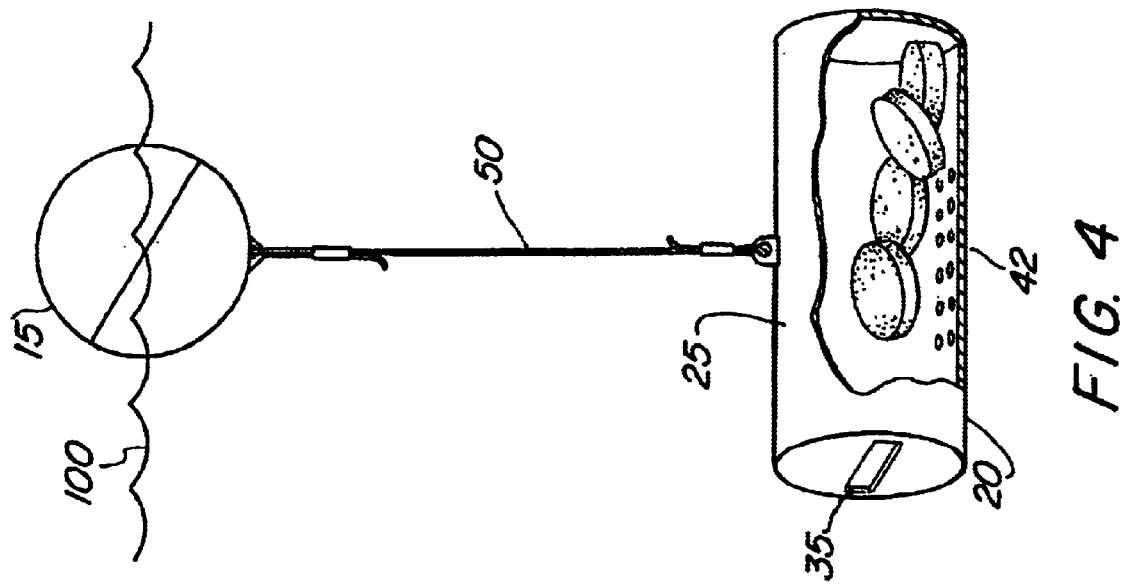

US 6,641,787 B1

CHEMICAL DISPENSER

TECHNICAL FIELD

The present invention is a chemical dispenser, preferably for dispensing chlorine or bromine to pools, spas, and hot tubs.

BACKGROUND ART

Prior art chemical dispensers are used to dispense chlorine or bromine into the water of pools, spas and hot tubs. These prior art dispensers typically float on the surface of the water or sit on the bottom of the pool, spa or hot tub to dispense chemicals from solid tablets. However, these prior art dispensers usually do not indicate when they are empty and need refilling. The operator usually must check the dispenser by retrieving the dispenser from the pool, opening the dispenser and checking to determine whether the tablets are exhausted and the dispenser needs to be refilled. Because of the bleaching and/or corrosive nature of chlorine, if the tablets are not completely eroded, the task is not pleasant and indeed may be harmful or damaging to the skin unless gloves or protective gear is worn. A visual signal that indicates when the dispenser is empty or almost empty would be useful.

SUMMARY OF THE INVENTION

The present invention is a chemical dispenser, preferably for dispensing chlorine or bromine to pools, spas, and hot tubs. The preferred embodiment comprises a buoyant vessel connected to a sea creature-shaped dispenser vessel by a line. The sea creature-shaped dispenser vessel comprises a buoyant shell and a cargo chamber. The cargo chamber comprises an insertion port and a permeable surface. The permeable surface comprises a plurality of dissolution ports.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a side, partial cross-sectional view of a preferred embodiment of the invention in a body of water.

FIG. 5 is a side, partial cross-sectional view of an alternative embodiment of the invention with a buoyant chamber.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a chemical dispenser.

Figure 1:
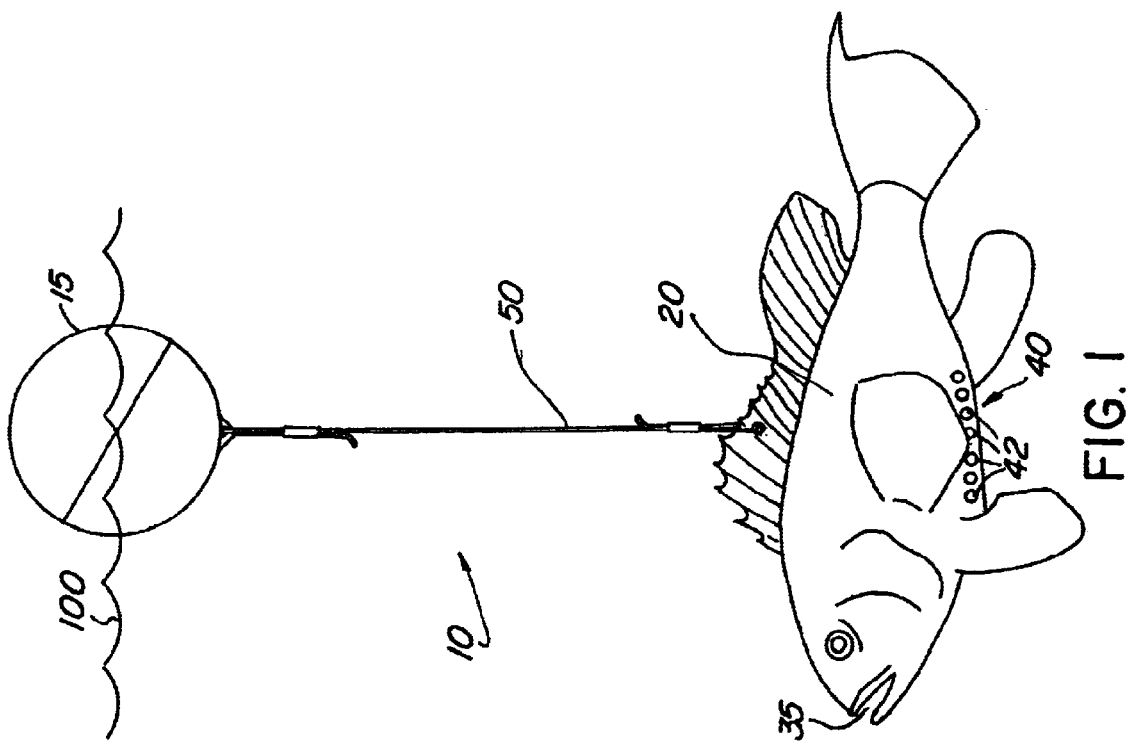
FIG. 1 is a side view of a preferred embodiment of the invention in a body of water.

Referring now to FIG. 1, a chemical dispenser 10 in a body of water 100 is depicted. The chemical dispenser 10 comprises a buoyant vessel 15 connected to a sea creature-shaped dispenser vessel 20. A preferred embodiment of the buoyant vessel 15 is depicted in FIG. 1 as a two-tone bobber configuration. However, the invention functions properly when the buoyant vessel 15 is of any configuration that floats on the surface of the body of water 100 while supporting dispenser vessel 20.

Figure 3:
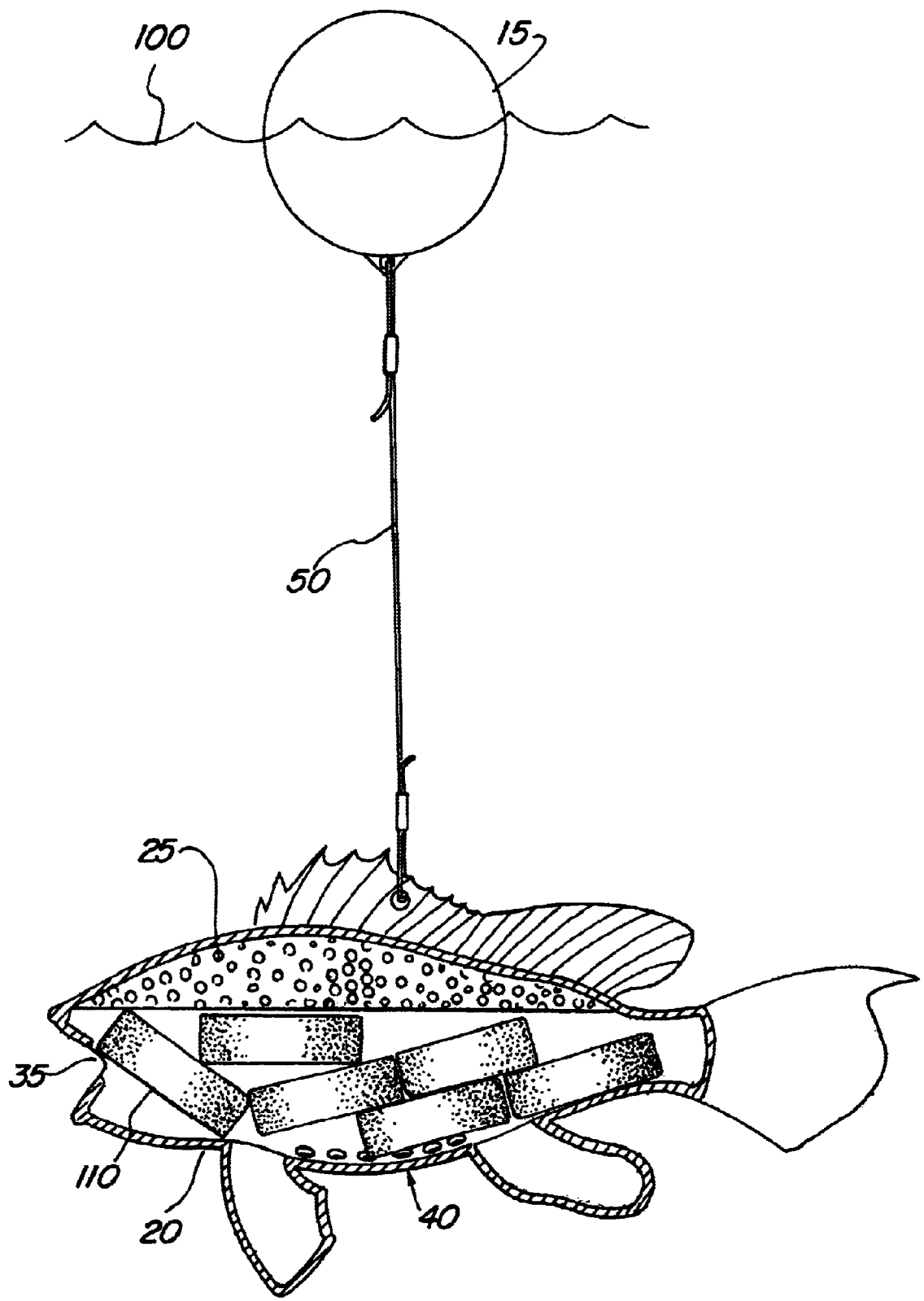
FIG. 3 is a partial cross-sectional view of a preferred embodiment of the invention in a body of water.

Referring to FIG. 3, the sea creature-shaped dispenser vessel 20 comprises a buoyant shell 25 encapsulating a cargo chamber 30 and comprising an insertion port 35 and a permeable surface 40. The insertion port 35 must be of sufficient size for insertion of chemicals to be dispensed, including but not limited to, bromine or chlorine tablets 110. A preferred embodiment of the permeable surface 40 comprises a plurality of dissolution ports 42. The buoyant vessel 15 is connected to the dispenser vessel 20 by a line 50. The buoyant vessel 15 and dispenser vessel 20 are preferably made of poly-vinyl chloride ("PVC") or polyethylene ("PE").

Preferably, to operate the invention, tablets 110 of chemicals such as chlorine or bromine are inserted into the insertion port 35 and the tablets 10 add weight to the dispenser vessel 20 and fill the cargo chamber 30. With the added weight to the dispenser vessel 20, the dispenser vessel 20 sinks in the body of water 100 and is suspended below the water by the buoyant vessel 15 and line 50.

The permeable surface 40, in particular the dissolution ports 42, allows water into the cargo chamber to dissolve the tablets 110 and dispense the chemical to the body of water 100. For example, chlorine tablets 110 would dissolve and chlorinate the body of water 100. As the tablets 110 dissolve into the water 100, the dispenser vessel 20 becomes more buoyant and weighs less. When the tablets 110 reach a desired level of dissolution, the buoyant shell 25 rises in the water 100 until the dispenser vessel 20 surfaces. See FIG. 2.

Figure 2:
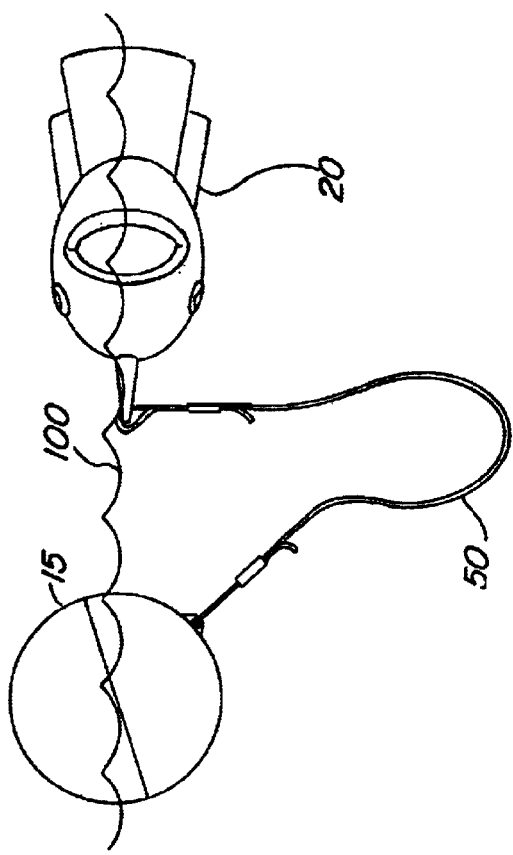
FIG. 2 is a front view of a preferred embodiment of the invention with a surfaced dispenser vessel.

The dispenser vessel 20 can take a variety of shapes. The preferred embodiments depicted in FIGS. 1, 2 and 3 are fish shapes. When floating on a surface of the water 100, the fish shaped dispenser vessel 20 gives the appearance of a dead fish and alerts the user to refill the dispenser vessel 20. Other shapes, inter alia, could be used such as merfolk, octopi, starfish, crustaceans and cetaceans. The dispenser vessel 20 can also be shaped like a submarine.

FIGS. 4 and 5 depict simple alternative preferred embodiments of the dispenser vessel 20. The dispenser vessel 20 is cylindrical. It still comprises an insertion port 35, a permeable surface 40, and dissolution ports 42.

In FIG. 4, the dispenser vessel 20 comprises a buoyant shell 25 encapsulating a cargo chamber 30 and comprises an insertion port 35 and a permeable surface 40. The buoyant shell 25 is of sufficient buoyancy to raise the dispenser vessel 20 to the surface when the chlorine tablets 110 have reached the desired level of dissolution.

In FIG. 5, the dispenser vessel 20 comprises a buoyant chamber 22 and a cargo chamber 30. The cargo chamber comprises an insertion port 35 and a plurality of dissolution ports 42. The buoyant chamber 22 has a specific density less than water such that it will cause the dispenser vessel 20 to surface when the chemicals in the cargo chamber 30 are sufficiently dissolved. The preferred embodiment of the buoyant chamber 22 is filled with buoyant foam 23.

Figure 6:
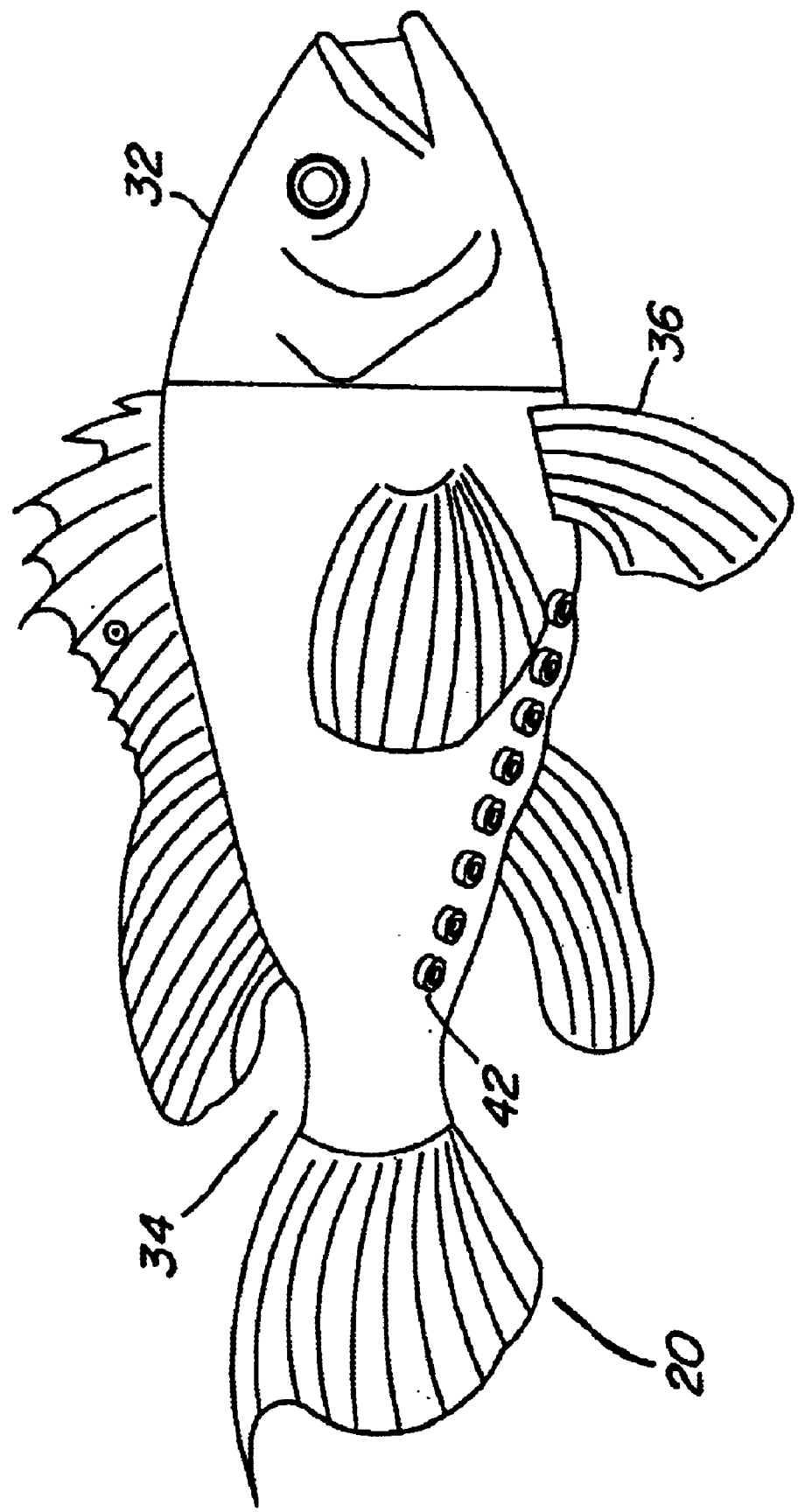
FIG. 6 is a side view of an alternative embodiment of the dispenser vessel.
Figure 7:
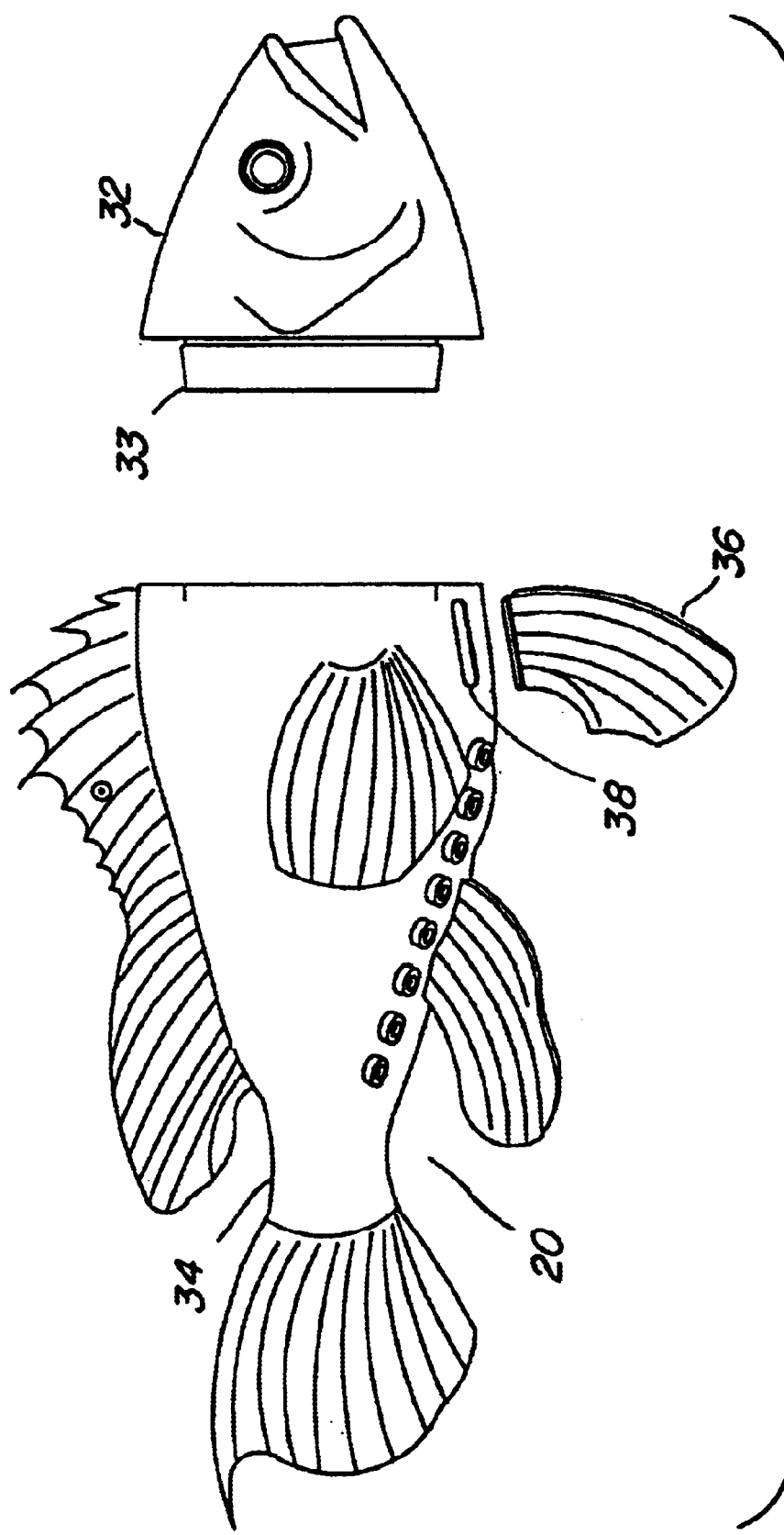
FIG. 7 is an exploded side view of an alternative embodiment of the dispenser vessel.

FIGS. 6 and 7 show another preferred embodiment of the dispenser vessel 20. Rather than using the mouth of the fish as an insertion port 35, as shown in FIGS. 1, 2 and 3. The dispenser vessel 20 comprises a head section 32 and a body section 34. The head section 32 separates from the body section 34 to allow the user to insert chemicals into the dispenser vessel 20. The head section 32 using a flange 33 can be snapped into the body section 34 to close the dispenser vessel 20. Alternatively, the head section 32 and body section 34 can be threaded and screwed together. The fins 36 of the body section 34 can also be inserted into slots 38 in the body section 34 to give an attractive, life-like and fish-like appearance. Said fins 36 can be loosely fitted into slots 38 so that when the dispenser vessel 20 is submerged there can be life-like movement of the fins 36 with respect to the dispenser vessel 20.

FIGS. 6 and 7also show another preferred embodiment of the dissolution ports 42. The dissolution ports 42 are raised from the permeable surface 40 on the dispenser vessel 20. Preferably, each port 42 is initially closed. The user can open individual dissolution ports 42 as needed depending on, inter alia, the size of the pool and the desired flow of chemicals. For example, more dissolution ports 42 would typically be opened when the chemical dispenser 10 is placed in a swimming pool instead of a hot tub or spa to allow for a greater flow of chemicals from the dispenser vessel 20.

Thus, a chemical dispenser with a useful visual signal that indicates when the dispenser is empty or almost empty is described above. In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A chemical dispenser for a body of water, comprising:
    a buoyant flotation vessel floating on the body of water;
    a dispenser vessel, with a buoyant shell having an insertion port and a permeable surface encapsulating a cargo chamber, the dispenser vessel adapted to float on the body of water when empty, and to submerge below the surface of the body of water when an amount of chemical is added to the cargo chamber; and
    a line of predetermined length connecting the buoyant vessel on ton of the water to the submerged dispenser vessel, the line and buoyant shell preventing the dispenser vessel from sinking to the bottom of the body of water when the chemical is added to the dispenser vessel.

2. The chemical dispenser of claim 1 wherein the permeable surface comprises a plurality of dissolution ports.

3. The chemical dispenser of claim 1 wherein the dispenser vessel is shaped like a sea creature.

4. The chemical dispenser of claim 1 wherein the permeable surface is permeable to water.

5. The chemical dispenser of claim 4 wherein the permeable surface is permeable to chlorine.

6. The chemical dispenser of claim 4 wherein the permeable surface is permeable to bromine.

7. A chemical dispenser for a body of water comprising:
    a buoyant flotation vessel floating on the body of water
    a dispenser vessel having a buoyant chamber and a cargo chamber, said cargo chamber having an insertion port and a permeable surface, the dispenser vessel adapted to float on the body of water when empty, and to submerge below the surface of the body of water when an amount of chemical is added to the cargo chamber; and
    a line of predetermined length connecting the buoyant vessel on top of the water to the dispenser vessel under the water, the line and buoyant vessel preventing the dispenser vessel from sinking to the bottom of the body of water when the chemical is in the dispenser vessel.

8. The chemical dispenser of claim 7 wherein the permeable surface comprises a plurality of dissolution ports.

9. The chemical dispenser of claim 7 wherein the permeable surface is permeable to water.

10. The chemical dispenser of claim 7 wherein the permeable surface is permeable to chlorine.

11. The chemical dispenser of claim 7 wherein the dispenser vessel is shaped like a sea creature.

12. A chemical dispenser for a body of water comprising:
    a buoyant floatation vessel floating on the body of water
    a sea creature-shaped dispenser vessel having a head section and a body section, the body section including a plurality of dissolution ports, the dispenser vessel adapted to float on the body of water when empty, and to submerge below the surface of the body of water when an amount of chemical is added to the body section; and
    a line of predetermined length connecting the buoyant vessel on top of the water to the dispenser vessel under the water, the line and buoyant vessel preventing the dispenser vessel from sinking to the bottom of the body of water when full of chemical.

13. The chemical dispenser of claim 12 wherein the chemical is water soluble, and as the chemical dissolves in water the submerged dispenser vessel rises.

14. The chemical dispenser of claim 12 wherein the submerged dispenser vessel rises to the surface of the body of water as the chemical becomes depleted.

* * * * *